Figure 1:
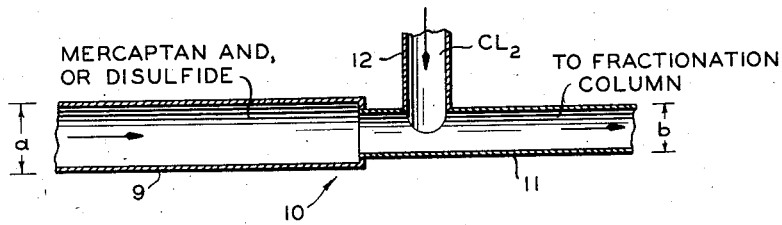

Sept. 23, 1958     R. P. LOUTHAN     2,853,516
METHOD OF REACTING A HALOGEN WITH AN ALKYL
MERCAPTAN AND A DIALKYL DISULFIDE
Filed April 18, 1955

INVENTOR.
R. P. LOUTHAN
BY
Hudson & Young
ATTORNEYS

United States Patent Office 2,853,516
Patented Sept. 23, 1958

2,853,516

METHOD OF REACTING A HALOGEN WITH AN ALKYL MERCAPTAN AND A DIALKYL DISULFIDE

Rector P. Louthan, Bartlesville, Okla., assignor to Phillips Petroleum Company, a corporation of Delaware Application April 18, 1955, Serial No. 501,879

18 Claims. (Cl. 260—543)

This invention relates to a method for effecting contact and reaction of disulfides and/or mercaptans with halogen to form sulfenyl halides. In one aspect this invention relates to a method for contacting and reacting mercaptans and/or disulfides with halogen in a turbulent stream for a short period of time, to form sulfenyl halide product, with concomitantly improved halide product yields. In one aspect this invention relates to a method for contacting and reacting alkyl mercaptans and/or dialkyl disulfides with halogen to produce alkyl sulfenyl halides and/or tertiary alkyl thiosulfenyl halides by separately introducing a stream of the mercaptan and/or the disulfide and a stream of halogen into turbulent contact under reaction conditions to produce the said halide product and then immediately withdrawing all resulting reaction mixture from the zone of turbulence, whereby markedly improved yields of halide product are obtained. Other aspects of this invention and its several related particulars are evident from a perusal of this disclosure and the appended claims.

Halogenation of an alkyl mercaptan and/or a dialkyl disulfide to form an alkylsulfenyl halide and/or a tertiary alkyl thiosulfenyl halide as disclosed and claimed in the copending application of Chester M. Himel, Serial No. 387,386, filed October 21, 1953, as a continuation-in-part of application Serial No. 89,475, filed April 25, 1949, now forfeited.

As set forth in the co-pending application above referred to, the alkyl mercaptan and the dialkyl disulfide reactant can be reacted, each alone or in admixture with the halogen, to form the sulfenyl halide product. The halogen and sulfur-containing reactants are reacted in equimolar proportions, i. e., the product is a result of the reaction of one mole of halogen with one mole of sulfur-containing reactant, it being understood that proportions of halogen and of sulfur-containing reactant, other than equimolar, can be in the reaction system.

The halide-forming reaction by which it is meant the above-referred to reaction of mercaptan and/or disulfide with halogen to form halide product, can be accomplished over a wide range of temperatures as high as 400° F. or higher and as low as −300° F., preferred temperatures being in the range of about −125 to about 150° F., although temperatures in the range of −125 to 250° F. are often advantageously employed.

When a primary or secondary alkyl mercaptan or dialkyl disulfide is employed, the principal reaction product is alkyl sulfenyl halide; and when employing a tertiary alkyl mercaptan or dialkyl disulfide, the principal reaction product is dependent upon the reaction temperature employed. More specifically, when employing the tertiary alkyl mercaptan or disulfide reactant at a temperature in the range of −300 to −30° F., preferably −125 to −50° F., the principal reaction product is the tertiary alkylthiosulfenyl halide, and when using a temperature above −30° F., and preferably from 40 to 250° F., the principal reaction product is the tertiary alkylsulfenyl halide. At these higher temperatures and at any higher temperature employed, the formation of the tertiary alkylthiosulfenyl halide proceeds concomitantly with the formation of tertiary alkylsulfenyl halide, although under these conditions the latter is the principal product of the reaction.

It is generally advantageous, although not required, to conduct the halogen-mercaptan or disulfide reaction in the presence of a solvent inert chemically to the reaction mixture, preferred solvents being paraffin hydrocarbons, as for example n-pentane, isopentane, isoheptane, n-hexane, isohexane, n-heptane, although higher boiling paraffins can be employed if desired. Suitable cuts or fractions of natural gasoline or any other suitable paraffin mixture can be utilized. Chlorinated hydrocarbon solvents are advantageously employed, as for example chloroform, carbon tetrachloride, ethylene dichloride and ethylidene dichloride.

All halogens, chlorine, bromine, iodine and fluorine, are employed in accordance with this invention and of these, chlorine is now preferred.

Alkyl mercaptans and/or dialkyl disulfide reactants of any desired molecular weight can be employed, although generally the said reactant is one having about 12 carbon atoms per alkyl group or less, although such reactants having about 16 carbon atoms per alkyl group, or higher, can be advantageously utilized. The alkyl groups of the dialkyl disulfide can be the same or different.

Although the halogen-mercaptan and/or dialkyl disulfide reaction can be conducted in the presence of water, somewhat higher yields of halide product are obtained at lower water concentrations.

In carrying out the halogen-mercaptan and/or disulfide reaction, it has been preferred to add halogen to the mercaptan and/or the disulfide either batch-wise or in a continuous operation, the latter comprising means for effecting ordinary admixture of the two reactants such as in a stirred reactor or step-wise addition of halogen to the reactant while continuously withdrawing product from the reaction zone.

This invention is concerned with a method for effecting contacting and reaction of halogen and mercaptans and/or dialkyl disulfides to produce sulfenyl halides in improved high yields.

An object of this invention is to provide a method for reacting mercaptans and/or disulfides with halogen to produce sulfenyl halides, under contacting conditions providing improved high product yields. Another object is to provide for contacting and reacting halogen and alkyl mercaptans and/or dialkyl disulfides in a turbulent stream to produce alkyl sulfenyl halides in improved high yield. Another object is to provide means for effecting turbulent contact of halogen, mercaptan and/or disulfide reactants to produce halide product in improved high yields. Other objects of this invention and its several related particulars are evident from a perusal of this disclosure and the appended claims.

In accordance with this invention a process is provided for markedly increasing efficiency of reaction and contact of halogen, mercaptan and/or disulfides to produce sulfenyl halides as product and of control of residence time of reactants and product with concomitantly improved high yield of reaction product, which comprises introducing a stream of halogen and at least one separate stream of mercaptan and/or disulfide into intimate turbulent contact under reaction conditions, and then immediately withdrawing all of the resulting reaction mixture from the zone of turbulence.

In accordance with another, and now preferred form, alkyl sulfenyl halides and alkyl thiosulfenyl halides are formed in improved yield from alkyl mercaptans and/or dialkyl disulfides and a halogen, by introducing a stream of mercaptan and/or disulfide reactant and a separate stream of halogen reactant each into intimate turbulent contact in a small zone of turbulence under reaction conditions to form at least one of the said halide products, and then immediately withdrawing all of the resulting reaction mixture from the zone of turbulence.

In accordance with a now preferred embodiment, and by way of further illustration of my invention, a stream of an alkyl mercaptan, such as isopropyl mercaptan, and a separate stream of halogen, such as chlorine, are passed separately into any suitable flow system in which the separate reactant streams can be introduced into intimate turbulent contact in a small zone of turbulence thereby effecting very rapid mixing of reactants, a preferred flow arrangement for reactants and withdrawal of reaction mixture being that carried out in a T-shaped reaction tube. Thus, the mercaptan and halogen streams are introduced through separate legs of a T and are initially contacted therein at a point in close proximity to the inlet of a third leg of the T, all under reaction conditions, subsequent to which reaction all resulting reaction mixture is immediately withdrawn via the third T leg. The degree of turbulence in this embodiment is determined by the linear velocities of the separate mercaptan and halogen reactant stream at the time initial contacting takes place. Effluent withdrawn via the third leg of the T is passed to fractionation for product recovery.

My invention provides an intimate turbulence that is necessary for comingling of the rapidly reacting halogen, mercaptan and disulfide reactants of this invention and for substantially reducing any undesirable side reactions, by uniformly subjecting surfaces of one reactant to direct contact with surfaces of another without there being any local over-concentration of any reaction mixture component. Accordingly, all reactants are caused to enter into direct reaction immediately subsequent to which the reaction mixture is withdrawn, thereby substantially reducing any opportunity for secondary reaction to take place, particularly those involving reaction product, e. g., polyhalogenated product formation.

In a preferred form of the process of this invention, a solvent is employed in conjunction with the mercaptan and/or disulfide reactant as described hereinabove with reference to the copending application Serial No. 387,386. Thus, preferably, a solution of sulfur-bearing reactant is introduced into intimate turbulent contact with the halogen, the solvent being inert to any chemical reaction in the system and being easily separated from the effluent for reuse.

This invention is advantageously applied to sulfenyl- and thiosulfenyl halide-forming reactions wherein alkyl mercaptans, RSH, and/or dialkyl disulfides, RSSR, are reacted, with halogen to produce alkyl sulfenyl halides and alkyl thiosulfenyl halides, respectively, RSX and RSSX. Any R in any of the above formulas, RSH, RSSR and RSX, can be any straight or branched chain alkyl group, R in RSSX being a tertiary alkyl group. Although reactant and product alkyl groups described hereinabove contain generally from about 1 to about 16 and, preferably from about 1 to about 12 carbon atoms, such alkyl radicals containing more than 16 carbon atoms can be employed if desired, so that my invention is not limited thereby.

I have found that, when employing the T-shaped reaction tube discussed hereinabove, the linear velocity of the reactant streams entering the small zone of turbulence should preferably be at least five feet per second in order to attain the degree of turbulence generally necessary to avoid local over-concentrations of reactants, over-concentrations of halogen reactant being particularly harmful. It is generally preferred that the velocity of the reactant streams at the point of entry into the T-shaped reaction zone be above about 100 feet per second.

Exemplary of mercaptan reactants which can be employed in the above-described mercaptan-halogen reaction are methanethiol, isopropanethiol, isobutanethiol, n-hexanethiol, 2,3,4-trimethylpentane-1-thiol, n-dodecanethiol, n-hexadecanethiol, 4-ethyl-6-methyldecane-4-thiol, 2,3-dimethyloctane-3-thiol, 2,2,4-trimethylpentane-4-thiol, 2,2,4,4,6-pentamethylheptane-7-thiol, ethanethiol, n-decane-1-thiol, 3,4-diethyldecane-4-thiol. Exemplary of dialkyl disulfide reactants in the disulfide-halogen reactions described herein are diethyl disulfide, di-isopropyl disulfide, di-t-butyl disulfide, di-iso-octyl disulfide, di-n-dodecyl disulfide, di-n-hexadecyl disulfide, n-hexyl n-decyl disulfide, n-butyl sec-octyl disulfide, t-amyl n-dodecyl disulfide, methyl t-butyl disulfide.

Although all halogens may be reacted in the halide-forming reactions discussed hereinabove, chlorine, bromine and iodine are preferred, and of these, chlorine being most generally employed, particularly in view of its availability and low cost.

The halide-forming reaction of the method of this invention can be carried out in either vapor phase or liquid phase, liquid phase operation being preferred, particularly when employing the liquid mercaptan and/or disulfide reactant dissolved in a suitable hydrocarbon solvent of the type described herein. Preferably, the reactant streams are introduced into intimate turbulence so that one reactant is dispersed in a single body of one phase of another reactant.

The temperature conditions employed when applying this invention to the alkyl mercaptan and/or the dialkyl disulfide-halogen reactions are those set forth hereinabove with reference to the said copending application Serial No. 387,386, wherein it is disclosed that temperatures up to 400° F. can be employed, and higher, e. g. 450° F. or above.

It is to be understood that, when referring herein to effecting intimate turbulent contact in a small zone of turbulence, it is meant that the said zone of turbulence be unobstructed, i. e., free from any equipment parts to thereby facilitate intimacy of turbulent contact.

Figures 4, 5:
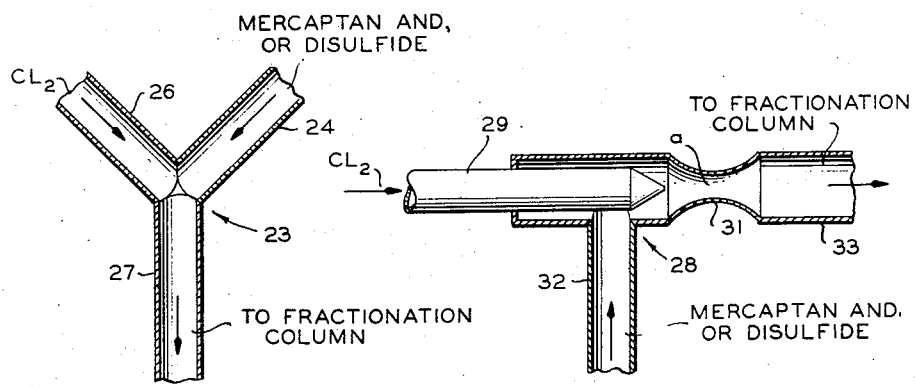

In accordance with one embodiment a modified aspirator type of mixing apparatus is employed. This is shown in Figure 5 of the drawings.

When bringing separate reactant streams into intimate turbulent contact in a small zone of turbulence in accordance with this invention and immediately withdrawing total reaction product from the intimate contacting zone, only fresh sulfur-bearing reactant is brought in contact with the halogen and the sulfenyl halide formed does not, therefore, have a chance to come in contact with additional halogen, as a result of which there is a marked reduction in the formation of byproducts, e. g. polychlorinated compounds, that can otherwise take place when product is contacted with additional halogen. This is true whether vapor phase or liquid phase halogenation is employed.

As set forth herein, there is a linear velocity of reactant streams below which unduly low product yield is obtained, since at lower linear velocities, i. e., lower than minimum permissible, local excesses of halogen would result with incomplete mixing of halogen and sulfur-bearing reactant with concomitantly low product yield.

Although equimolar proportions of halogen and sulfur-bearing reactant react to form the halide product, and although it has heretofore been for that reason most desirable, in most utilizations, to introduce equimolar proportions of reactants to the system, reactant mol ratios over a broader range can be employed in the practice of this invention without impairing product yields, for example, within the range of 0.9 to 1.1 mols of halogen per mol of mercaptan and/or disulfide reactant.

Residence time, in the turbulence zone, of reactants and products in the halogen-mercaptan and/or disulfide reaction, in accordance with this invention, can be over a relatively broad range without impairing yield of product, reaction time, when employing an intimate turbulent contact reaction in accordance with my invention, being generally not critical. Thus, by way of example, high product yields have been obtained when employing a contact time as high as 10 seconds and as low as 0.001 second and lower.

My invention is further illustrated with reference to the following examples:

EXAMPLE I

A stream of tertiary-butyl mercaptan dissolved in a hydrocarbon solvent and a gaseous chlorine stream were fed at various rates to a rubber stoppered, 4 ounce widemouth sample jar equipped with a magnetic stirrer. The sample jar was equipped with an outlet tube extending through the stopper a distance approximately one-half of the depth of the jar. As the chlorine and alkyl mercaptan reacted, hydrogen chloride gas was formed which created a gaseous pressure cap over the liquid as the liquid level was raised above the end of the outlet tube. This pressure cap forced liquid out of the outlet tube. This outlet tube passed to a ½ inch glass continuous distillation column which was packed with ¼ inch glass helices. The chlorinated product from the stirred reactor was thus fed to the center of the column, where the HCl gas present was stripped off. The column was wrapped with resistance wire so that heat could be supplied. The column was also equipped with a 250 cc. round bottomed reboiler fitted with a side draw-off line having a stop-cock valve. The teriary butylsulfenyl chloride bottoms product was drawn off periodically by means of this stop-cock to a suction flask equipped with a reflux condenser. At the end of a run, the chlorinated solution in the suction flask and the product remaining in the column reboiler were combined and stirred with an equal molar quantity, based on the theoretical amount of tertiary butylsulfenyl chloride, of 40 percent aqueous sodium dimethyl dithiocarbamate to form N,N-dimethyl-t-butylsulfenyl dithiocarbamate. The yields are based on the amount of N,N-dimethyl-t-butylsulfenyl dithiocarbamate formed. The chloride was metered as a gas phase through a flowmeter, while the mercaptan-solvent stream was metered with a small micro-bellows pulsating feed pump. Each run was of one hour duration. The results of several of these runs are tabulated below.

place within the column. A stream containing tertiary butyl mercaptan dissolved in a suitable hydrocarbon solvent was fed to the column by the same feed pump as described in the preceding example. A gaseous chlorine stream was fed into the column at a point 8 inches below the mercaptan inlet, thus providing a reaction zone 8 inches long and ½ inch in diameter. Sufficient heat was supplied to reboiler to keep the tertiary butylsulfenyl chloride product boiling vigorously, and the HCl gas that was formed was allowed to pass to the atmosphere at the top of the column. The tertiary butylsulfenyl chloride bottoms product was drawn off periodically through the stop-cock and suction flask as in the previous example, and the reboiler contents were combined with the drawn off portions at the end of the run. N,N-dimethyl-t-butylsulfenyl dithiocarbamate was prepared as before and the yields expressed as the amount of N,N-dimethyl-t-butylsulfenyl dithiocarbamate formed. Runs were made with various hydrocarbon solvents and at various mol ratios of mercaptan to chlorine. Each run was of one hour duration. The results of these runs are tabulated below.

*Table II.—Chlorination in packed column*

|  | Run 1 | Run 2 | Run 3 | Run 4 | Run 5 |
|---|---|---|---|---|---|
| Chlorination Temp., °F | 125 | 128 | 130 | 135 | 91 |
| Solvent Used | n-hexane | n-hexane | n-hexane | n-hexane | n-pentane |
| Concentration of Mercaptan Solution, Grams/Liter | 100 | 100 | 100 | 100 | 100 |
| Grams Mercaptan Charged | 91.3 | 88.9 | 94.1 | 89.5 | 89.7 |
| Grams Chlorine Charged | 76 | 70 | 62 | 73 | 68 |
| Mol Ratio Mercaptan to Chlorine | 0.95 | 1.01 | 1.20 | 0.97 | 1.04 |
| Wt. of Yield Product Obtained, Grams | 123.7 | 120.2 | 89.2 | 125.7 | 126.6 |
| Mol Percent Yield (based on mercaptan) | 58.2 | 58.3 | 40.8 | 60.4 | 60.7 |
| Melting Point of Product, °C | 60–69 | 67–70 | 70.5–71.2 | 62–70 | 63–70 |

EXAMPLE III

The equipment used in the preceding example was modified by adding a glass mixing T. The pulsating pump used for feeding mercaptan was modified so that a steady feed rate could be obtained by allowing the pump to discharge into an open test tube to which a glass tube had been sealed into the bottom. This test tube was placed approximately 3 feet above the mixing T and was connected to the T through a needle valve by a ¼ inch Saran tube. A steady flow of mercaptan-solvent solution to the mixing T was maintained by adjusting the needle valve to keep a constant level of solution in the test tube. A series of runs was made in which the gaseous chlorine and alkyl mercaptan[1]-solvent were fed simultaneously to the directly opposing legs of the mixing T. The third leg of the mixing T was connected directly to the distillation column of the preceding example. In this example where a 0.5 mm. mixing T was employed the contact time was calculated to be about 0.001 second at the given rates of flow of mercaptan and chlorine; where a 2 mm. mixing T was used the calculated contact time was about 0.02 second. The alkylsulfenyl chloride and the HCl gas formed were thus fed directly into the distillation column where they were immediately separated. Alkyl-

*Table I.—Chlorination in stirred reactor*

|  | Run 1 | Run 2 | Run 3 | Run 4 | Run 5 |
|---|---|---|---|---|---|
| Chlorination Temperature | 131 | 130 | 131 | 135 | 135 |
| Solvent | n-hexane | n-hexane | n-hexane | n-hexane | n-hexane |
| Conc. of Mercaptan Soln., Grams/Liter | 100 | 105 | 100 | 100 | 110 |
| Grams Mercaptan Charged | 89.4 | 93.2 | 89.5 | 90.2 | 100 |
| Grams Chlorine Charged | 70 | 71 | 74 | 73 | 71 |
| Mol Ratio-Mercaptan to Chlorine | 1.01 | 1.04 | 0.96 | 0.98 | 1.13 |
| Grams Yield Product Obtained | 116.2 | 120.7 | 130.3 | 125.7 | 113.6 |
| Mol Percent Yield Based on Mercaptan | 55.9 | 55.7 | 62.7 | 60.1 | 48.9 |
| Melting Point of Product, °C | 69–71.5 | 64–70 | 69.5–71.2 | 70.5–72 | 68.5–71.0 |

EXAMPLE II

The column described in the preceding example was used to attempt higher yields of tertiary butylsulfenyl chloride by causing the reaction of Example I to take

[1] Tert-butyl mercaptan in runs 1–9; tert-dodecyl mercaptan in run 10.

sulfenyl chloride was drawn off the bottom of the column as in the preceding example and the reboiler contents were combined with these portions in the same manner as before. N,N - dimethyl-t-butylsulfenyl dithiocarbamate was formed as previously described, and the yields were calculated from the amount of N,N-dimethyl-t-butylsulfenyl dithiocarbamate formed. Various runs were performed using various solvents and various feed rates. Each run was of one hour duration. The results of these runs are tabulated below.

EXAMPLE V

A run was made chlorinating liquid t-butyl mercaptan with no solvent present. One hundred eleven milliliters of t-butyl mercaptan (density 0.79) was mixed directly in the mixing T previously described with 71 grams of gaseous chlorine during a one hour run. The reaction products were fed directly to a 3-necked stirred one liter flask containing 360 grams of 40% sodium dimethyldithiocarbamate solution. Forty-five grams of sodium hydroxide was also added to the flask to react with the HCl reaction product. The N,N-dimethyl-t-butylsulfenyl dithiocarbamate formed in the flask was removed, filtered out of water, washed repeatedly with water and finally with 25% acetone, and dried in a vacuum oven. The yield was 151.0 grams, representing a mol percent yield based on mercaptan of 72.3 percent. The melting point of the product was 65–71° C. The calculated velocity of the reactants entering the reaction zone was 104 feet per second.

*Table III.—Chlorination using mixing T (liquid mercaptan[1]-solvent feed)*

|  | Run 1 | Run 2 | Run 3 | Run 4 | Run 5 |
|---|---|---|---|---|---|
| Inside Diameter of Mixing T (mms.) | 2 | 2 | 2 | 2 | 0.5 |
| Solvent Used | n-hexane | n-hexane | n-hexane | n-hexane | n-heptane |
| Conc. of Mercaptan Solution, Grams/Liter | 100 | 100 | 100 | 105 | 100 |
| Grams Mercaptan Charged | 89.6 | 89.7 | 90.5 | 95.3 | 90.4 |
| Grams Chlorine Charged | 76 | 71 | 68 | 68 | 76 |
| Mol Ratio, Mercaptan to Chlorine | 0.932 | 1.00 | 1.05 | 1.11 | 0.94 |
| Velocity of Combined Reactants entering Reaction Zone (ft./sec.) | 7.3 | 6.81 | 6.53 | 6.53 | 116.8 |
| Grams of Yield Product Obtained | 157.6 | 146.5 | 144.3 | 141.5 | 184.0 |
| Mol Percent Yield, Based on Mercaptan | 75.5 | 70.2 | 68.7 | 64.0 | 87.6 |
| Melting Point of Product, °C | 69–71.5 | 69.5–72 | 69.8–72 | 70–72.5 | 70.2–72 |

|  | Run 6 | Run 7 | Run 8 | Run 9 | Run 10 [1] |
|---|---|---|---|---|---|
| Inside Diameter of Mixing T (mms.) | 0.5 | 0.5 | 0.5 | 0.5 | 0.5 |
| Solvent Used | n-heptane | n-heptane | n-hexane | n-heptane | n-heptane |
| Conc. of Mercaptan Solution, Grams/Liter | 100 | 100 | 100 | 100 | 224 |
| Grams Mercaptan Charged | 88.6 | 90.3 | 90.1 | 89.8 | 202 |
| Grams Chlorine Charged | 71 | 71 | 69 | 68 | 71 |
| Mol Ratio, Mercaptan to Chlorine | 0.98 | 1.00 | 1.03 | 1.04 | 1.00 |
| Velocity of Combined reactants Entering Reaction Zone (ft./sec.) | 109 | 109 | 106 | 104 | 110 |
| Grams of Yield Product Obtained | 176.6 | 180.5 | 172.6 | 181.0 | 292.8 |
| Mol Percent Yield, Based on Mercaptan | 85.8 | 85.0 | 82.6 | 86.7 | 91.3 |
| Melting Point of Product, °C | 70.5–72 | 70.5–72 | 69–72 | 71–72.5 | (2) |

[1] Tert-butyl mercaptan in runs 1–9; tert-dodecyl mercaptan in run 10.
[2] Dark liquid refractive index 1.5451.

EXAMPLE IV

Several vapor phase runs were carried out in the mixing T of the preceding example. In these runs the mercaptan-hydrocarbon solvent was vaporized prior to being fed to the mixing T by feeding the mercaptan-solvent solution to the top of the distillation column previously described and withdrawing the vapor formed from the reboiler side outlet. The vapor thus formed was fed to the mixing T of Example III. Gaseous chlorine was fed to the mixing T as before and the reaction products from the mixing T were fed directly to a suction flask equipped with a reflux condenser. The HCl gas formed was vented to the atmosphere from the top of this flask, while the alkylsulfenyl chloride products were condensed as liquid. The liquid products were then reacted to form N,N-dimethyl-t-butylsulfenyl dithiocarbamate as before. Various hydrocarbon solvents and various feed rates were used, while the yields were calculated from the amount of N,N-dimethyl-t-butylsulfenyl dithiocarbamate formed. Each run was of one hour duration. The results of these runs are tabulated below.

EXAMPLE VI

Tertiary-butylsulfenyl chloride was prepared from di-tertiary-butyl disulfide in the following manner. A one hour run was made during which 1802 cc. of a solution of di-tertiary-butyl disulfide dissolved in normal heptane was chlorinated with 74 grams of chlorine in the apparatus of Example III. The concentration of the disulfide-normal heptane solution was 100 grams of di-tertiary-butyl disulfide per liter of solution. The mol ratio of di-tertiary-butyl disulfide to chlorine was 0.973. The tertiary-butylsulfenyl chloride formed was reacted with sodium di-

*Table IV.—Chlorination in mixing T (vaporized mercaptan[1]-solvent feed)*

|  | Run 1 | Run 2 | Run 3 | Run 4 | Run 5 |
|---|---|---|---|---|---|
| Inside Diameter of Mixing T (mms.) | 2 | 2 | 2 | 2 | 2 |
| Solvent Used | n-heptane | n-heptane | n-heptane | n-hexane | n-pentane |
| Conc. of Mercaptan Solution, Grams/Liter | 100 | 100 | 100 | 100 | 100 |
| Grams Mercaptan Charged | 88.9 | 88.9 | 89.7 | 90.0 | 90.4 |
| Grams Chlorine Charged | 68 | 71 | 69 | 69 | 72 |
| Mol Ratio, Mercaptan to Chlorine | 1.03 | 0.99 | 1.03 | 1.03 | 0.99 |
| Velocity of Combined Reactants Entering Reaction Zone (ft./sec.) | 49 | 50 | 50 | 50 | 50 |
| Chlorination Temp., °F | 342–396 | 265–308 | 219–222 | 152–170 | 115–126 |
| Grams of Yield Product Obtained | 161 | 164.4 | 149.2 | 171.5 | 161.1 |
| Mol Percent Yield, Based on Mercaptan | 78 | 79.7 | 71.6 | 82.0 | 78.2 |
| Melting Point of Product, °C | 70–72 | 70.2–72.5 | 71.2–73 | 71.5–72.8 | 71.0–72.9 |

[1] Tert-butyl mercaptan.

methyldithiocarbamate to form N,N-dimethyl-t-butylsulfenyl dithiocarbamate as described previously in the disclosure. The yield was 364.7 grams, representing an 87.3 mol percent yield based on di-tertiary-butyl disulfide.

A batch run was made in order to see if the batch reactor procedure (see Example I) would approach the high yields of the mixing T procedure when the dialkyl disulfide was used. In this run, a 160 grams of di-tertiary-butyl disulfide (dissolved in normal heptane) was reacted with 64 grams of chlorine. The morpholine derivative was prepared, and the yield was found to be 75.1 mol percent based on the disulfide. In still another batch run, it was found that by using 10 percent excess di-tertiary-butyldisulfide, the yield was increased to 82.7 mol percent. This yield still does not reach the 87.3 mol percent yield obtained when the mixing T was used.

The foregoing examples illustrate that, when employing conventional contacting procedures in carrying out reaction of mercaptan or disulfide reactants with halogen to form alkyl sulfenyl and/or tertiary alkylthiosulfenyl halides, significantly lower product yields, 40.8 to 62.7 percent are obtained (Examples I and II) than when employing a contacting procedure of this invention, i. e. introducing separate streams of reactants into intimate turbulent contact in a small zone of turbulence, e. g. the mixing T, the latter product yields being in the range of 64.0 to 91.3 percent (Examples III–VI). The advantages of this invention, described hereinabove, are clearly demonstrated by the foregoing examples, as manifested by the improved product yields obtained.

Although it is preferable to employ a linear velocity of separate reactant streams in the order of about 100 feet per second in order to effect the intimate turbulent contact required in accordance with a preferred embodiment of this invention, linear velocities in the order of about 120 feet per second have been found to result in yields of product in the order of 85 percent and higher. Thus, although higher linear velocities can be employed when desired, such velocities will generally be not required, although there is no upper limit of linear velocity to be employed.

Exemplary of another manner in which intimate turbulent contact of reactants can be achieved in accordance with this invention is the injection of halogen into the discharge side of a centrifugal pump delivering mercaptan and/or disulfide and immediate removal of the resulting reaction mixture to product recovery means.

Although I have described my invention particularly with reference to effecting intimate turbulent contact of reactants in a mixing T, this embodiment being now preferred, any suitable means can be employed for achieving intimate turbulent contact of reactants and is within the scope of this invention. Figures 1–5 are exemplary of such suitable means. Thus, with reference to Figure 1, mercaptan and/or disulfide reactants can be introduced into and through an elongated upstream section 9 of cross sectional diameter $a$ of reaction tube 10 into and through downstream section 11 aligned with section 9 and of relatively small cross-sectional diameter $b$ so as to increase linear velocity of that stream. Halogen, such as chlorine, is introduced into zone 11 via line 12 whereby, due to the high linear velocity conditions therein, turbulent contacting is achieved, total effluents being immediately withdrawn therefrom and discharged for product recovery.

Figures 2, 3:
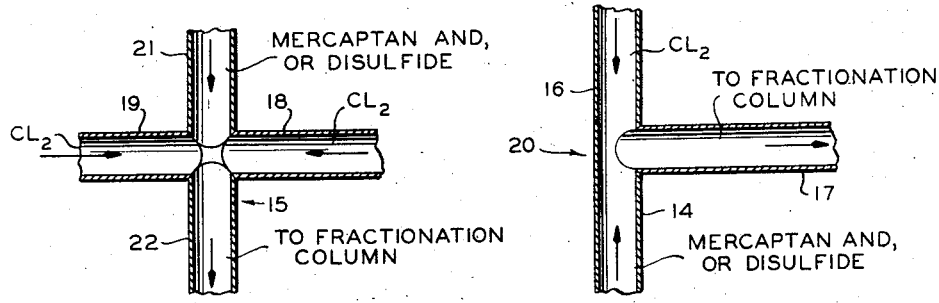

The preferred embodiment in which a mixing T is employed for setting up intimate turbulent contact of reactants is illustrated with reference to Figure 2. Thus, mercaptan and/or disulfide reactant, is introduced through leg 14 of the T 20, and halogen, such as chlorine, is introduced via leg 16 of the T. Effluents are immediately removed for fractionation via a third leg 17.

A mixing "cross" 15 can be employed as illustrated with reference to Figure 3, wherein halogen reactants are introduced via two separate legs 18 and 19 and mercaptan and/or disulfide is introduced via leg 21 into intimate contact therein and immediate withdrawal of effluents is effected via a fourth leg 22 for fractionation.

With reference to Figure 4 is shown a Y reaction tube 23 in which mercaptan and/or disulfide reactant is introduced through leg 24, and halogen, such as chlorine, is introduced through leg 26 with effluent withdrawal via line 27 for fractionation.

With reference to Figure 5 is shown modified aspirator 28 in which chlorine is introduced via line 29 into and through orifice 31 in turbulent contact in the throat $a$ of orifice 31 with mercaptan and/or disulfide introduced via line 32. Effluent is withdrawn via line 33 to fractionation. It is to be understood that contacting of separate reactant streams in accordance with this invention can be achieved by introducing reactants into contact with each other at right angles or at any suitable angle such as with reference to Figure 4, or can be introduced "head-on" in order to set up the desired turbulence within a very small area, i. e. a small zone of turbulent reaction. In all events, total reaction mixture is immediately withdrawn for fractionation and recovery of products.

Conditions described hereinabove, such as relative linear velocities of the reactant streams, temperature, and the like, are employed in any suitable embodiment for effecting intimate turbulent contact of this invention.

Reasonable variation and modification are possible within the scope of the foregoing disclosure and appended claims to the invention the essence of which is that, (1) in the reaction of mercaptans and/or disulfides with halogens to form alkylsulfenyl halides and tertiary alkylthiosulfenyl halides, improved high yield of halide product are obtained by introducing at least one stream of mercaptan and/or disulfide into turbulent contact with a separate stream of halogen under halide-forming conditions (RSX and/or RSSX), as in a small zone of turbulence, and then immediately withdrawing all components of the resulting reaction mixture from the zone of turbulence; (2) in one form the said intimate turbulent contact of the above said reactants is provided by introducing separate reactant streams through separate legs of a cross, Y- or T-shaped reaction tube and withdrawing total resulting reaction mixture through a third leg of the tube; (3) in another form, the said turbulence is caused by regulating linear rate of flow of the separate reactant streams into the said turbulent contact; (4) production of tertiary butylsulfenyl chloride and tertiary butylthiosulfenyl chloride from chlorine and tertiary butyl mercaptan and/or di-tertiary-butyl disulfide, in improved high yields is provided in accordance with a now preferred embodiment; (5) in still another form the said turbulence is effected in a modified aspirator type of mixing apparatus by introducing separate reactant streams into and through a venturi therein; and (6) in still another form the said turbulence is effected by injecting halogen reactant into the discharge side of a pump delivering sulfur-bearing reactants; all as described herein.

I claim:

1. In the method of reacting a compound selected from the group consisting of an alkyl mercaptan and a dialkyl disulfide with a halogen to form a halide selected from the group consisting of an alkyl sulfenyl halide and a tertiary thiosulfenyl halide, the improvement comprising introducing separate streams of said alkyl compound and said halogen into intimate turbulent contact in a reaction tube of restricted diameter for a contact time less than 10 seconds under reaction conditions for forming said halide product, and then immediately withdrawing all of said reaction mixture from said zone of turbulence, and thereby forming halide product in high yield.

2. The improvement of claim 1 wherein said halogen and alkyl compound streams are introduced through separate legs of a T-shaped reaction tube and said turbulence is set up in the said T, and all resulting reaction mixture is withdrawn from said zone of turbulence through a third leg of said T.

3. The improvement of claim 1 wherein said turbulent contact is effected by regulating linear velocities of the said separate reactant streams.

4. The improvement of claim 1 wherein said compound reactant is an alkyl mercaptan and said halogen is chlorine.

5. The improvement of claim 1 wherein said compound reactant is a dialkyl disulfide and said halogen is chlorine.

6. The improvement of claim 4 wherein said mercaptan is tertiary butyl mercaptan.

7. The improvement of claim 5 wherein said disulfide is di-tertiary-butyldisulfide.

8. The improvement of claim 1 wherein said reacting is effected in vapor phase.

9. The improvement of claim 1 wherein said reacting is effected in liquid phase containing gaseous halogen dispersed therein.

10. The improvement of claim 1 wherein separate streams of halogen and alkyl compound reactants are introduced into contact with each other each at a linear velocity of at least 5 feet per second and wherein temperature in the said zone of turbulence is in the range of from $-300$ to $+450°$ F.

11. The improvement of claim 10 wherein the linear velocity of at least one of said reactant streams is above about 100 feet per second.

12. The improvement of claim 10 wherein said compound reactant is an alkyl mercaptan and said halogen is chlorine.

13. The improvement of claim 10 wherein said compound reactant is a dialkyl disulfide and said halogen is chlorine.

14. The improvement of claim 10 wherein said separate streams of halogen and alkyl compound reactants are introduced into turbulent contact with each other for a time in the range of 0.001 to 10 seconds.

15. In the method for reacting tertiary butyl mercaptan with chlorine to form a halide selected from the group consisting of tertiary butylsulfenyl chloride and tertiary butylthiosulfenyl chloride, the improvement comprising introducing separate streams of said mercaptan and chlorine into turbulent contact in a reaction tube of restricted diameter under conditions for said reacting, maintaining said contact under intimate turbulent reaction conditions for a period of time less than 10 seconds to effect said reacting, and then immediately withdrawing all of resulting reaction mixture from the zone of turbulence to terminate the said reaction and thereby form halide product.

16. The method of claim 15 wherein said mercaptan and chlorine reactants are introduced through two legs of a T-shaped reaction tube and initial turbulent contact is effected in close proximity to a third leg of said tube, and total reaction mixture is withdrawn through the said third leg.

17. In the reaction of di-tertiary-butyldisulfide with chlorine to form a halide selected from the group consisting of tertiary butylsulfenyl chloride and tertiary butylthiosulfenyl chloride, comprising introducing separate streams of said disulfide and chlorine into turbulent contact in a reaction tube of restricted diameter under conditions for said reacting, maintaining said contact under intimate turbulent reaction conditions for a period of time less than 10 seconds to effect said reacting, and then immediately withdrawing all of resulting reaction mixture from the zone of turbulence to terminate the said reaction and thereby form halide product.

18. The method of claim 17 wherein said disulfide and chlorine reactants are introduced through two legs of a T-shaped reaction tube and initial turbulent contact is effected in close proximity to a third leg of said tube, and total reaction mixture is withdrawn through the said third leg.

References Cited in the file of this patent

UNITED STATES PATENTS 2,031,938     Deanesly et al. _ _ _ _ _ _ _ _ _ _ Feb. 25, 1936

OTHER REFERENCES

Brintzinger et al.: Ber. Deut. Chem., vol. 83, February 1950, p. 87.